S. CABOT.
SPACE TELEGRAPHY.
APPLICATION FILED APR. 4, 1906.

No. 899,243.

Patented Sept. 22, 1908.

WITNESSES:
Geo. K. Woodworth
Patrick J. Conroy

INVENTOR:
Sewall Cabot
by Alex. P. Browne
attorney.

UNITED STATES PATENT OFFICE.

SEWALL CABOT, OF BROOKLINE, MASSACHUSETTS, ASSIGNOR TO STONE TELEGRAPH AND TELEPHONE COMPANY, OF BOSTON, MASSACHUSETTS.

SPACE TELEGRAPHY.

No. 899,243.

Specification of Letters Patent.

Patented Sept. 22, 1908.

Application filed April 4, 1906. Serial No. 309,835.

*To all whom it may concern:*

Be it known that I, SEWALL CABOT, a citizen of the United States, and a resident of Brookline, in the county of Norfolk and State of Massachusetts, have invented a new and useful Improvement in Space Telegraphy, of which the following is a specification.

My invention relates to the art of space telegraphy in which signals are transmitted by means of electromagnetic waves without the use of wires to guide the waves to their destination; and it relates more particularly to an apparatus for receiving the energy of such waves.

To receive the energy of electromagnetic signal waves and to produce the indication of intelligible signals, I employ a dynamo electric machine having an armature winding and a magnetic-field producing means, and the electrical oscillations to be detected are conveyed through a coil associated with a portion of the magnetic circuit of said dynamo electric machine, which coil may constitute a portion of the armature winding, thereby to produce a variation in the permeability of that portion of said magnetic circuit with which said coil is associated. By the aforesaid variation in permeability, there is produced a corresponding variation in the magnetic flux flowing in said portion of said magnetic circuit and threading the armature winding or a portion thereof. The variation in the flux density embracing said armature winding or a portion of said winding produces a corresponding variation in the currents flowing in said armature winding and in the external circuit of the dynamo, in which circuit a translating device is included, and by the relative motion between the armature winding and the field-producing means of the dynamo, said current variations are greatly amplified, means being provided for so relating said armature winding and said field-producing means that the energy of motion of said armature winding is converted into electrical energy.

My invention may best be understood by having reference to the drawings which accompany and form a part of this specification and which illustrate diagrammatically one of the embodiments thereof.

Figure 1:
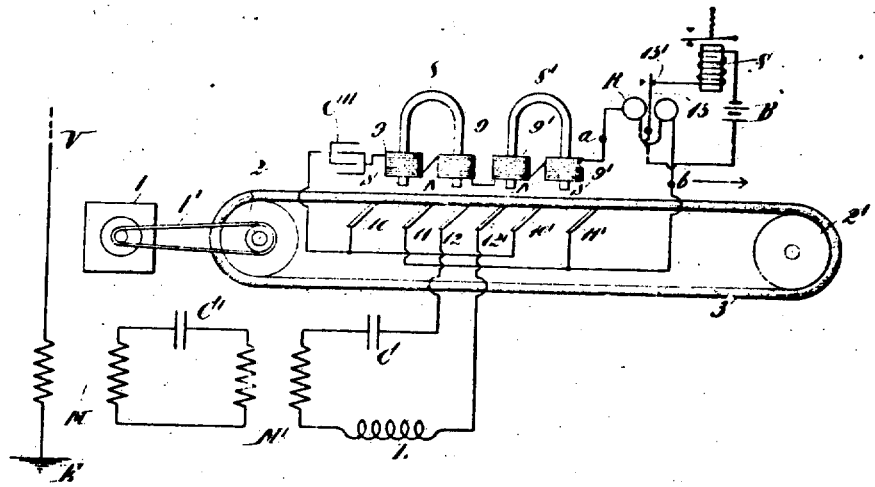
Figures 2, 3:
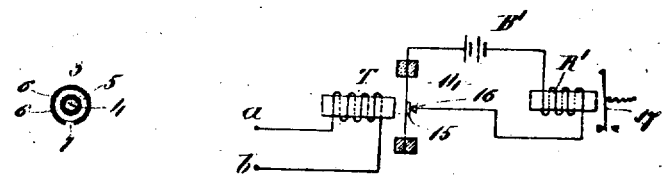
Figure 4:
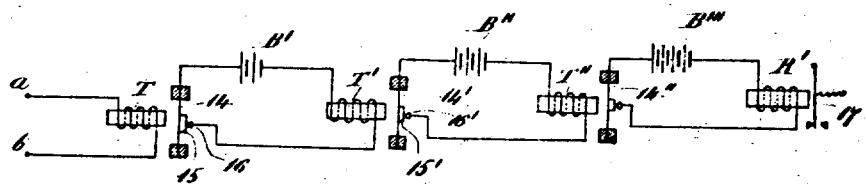

In the drawings Figure 1 represents in diagram one embodiment of my invention associated with a space telegraph receiving system. Fig. 2 represents a sectional view of the armature 3. Fig. 3 represents a modification of the signal-indicating device employed in connection with the oscillation detector. Fig. 4 represents another modification of the signal-indicating device.

In Fig. 1, 3 represents the armature of a dynamo electric machine of which the coils 9, 9' surrounding the ends of the magnets 8, 8' are the field windings. As shown in Fig. 2, the armature comprises a core 4 consisting preferably of a plurality of hard iron or steel wires of small diameter around which is spiraled an insulated copper wire 5, forming a closed electric circuit, and a portion of the insulation 6 of said wire 5 is removed from the closed circuit armature winding throughout its entire extent in a direction substantially at right angles to the pitch of its spirals, as shown at 7. The closed circuit armature winding and its core are mounted between two pulleys 2, 2', one of which is driven by any suitable prime mover 1 which as shown is connected to the pulley 2 by a belt 1'. Two pairs of brushes 10, 10' and 11, 11' make electrical contact with the armature winding 5 through the groove 7 in the insulation thereof and are connected in series with the field windings 9, 9' and a suitable signal-indicating device or relay R. The permanent magnets 8, 8' through the fields of which the armature is moved are arranged as shown so that their like poles are adjacent.

It will now be apparent that if the brush 10 were connected directly to the coil 9 surrounding the S pole of the magnet 8, the movement of the armature through the magnetic fields of the magnets 8, 8' will create a current in the closed circuit armature winding 5 which will be translated to the external circuit of the dynamo *a* R *b* and through the field coils 9, 9' by means of the brushes 10, 10', 11, 11', and that said current so flowing through said coils will cause the fields to build up and thereby greatly increase the current in said external circuit. In order to prevent the aforesaid building up effect and the resulting energization of the relay or translating device R when waves are not being received, a condenser C'' may be connected in series with the dynamo brushes, the field coils and the device R.

It will of course be understood that the windings 9, 9' are so constructed that the flux produced by electric currents circulating therein will be in the same direction as the flux produced by the permanent magnets S, S', respectively, with which said windings are associated. The brushes 10', 11, should preferably be placed approximately midway between the poles of the magnets S' S, respectively, and the brushes 11', 10 may be placed slightly beyond the outer poles, herein shown as the S poles, of the magnets S' S, respectively. The electrical oscillations to be detected are conveyed through a coil associated with a portion of the magnetic circuit of the aforesaid dynamo electric machine and said coil may be that portion of the armature winding included between the two brushes 12, 12' which contact with said armature winding through the aforesaid groove 7 in the insulation thereof. The brushes 12, 12' preferably are so located that the portion of the armature winding included between them is approximately equidistant from the adjacent poles, herein shown as the N poles, of the magnets S, S' so that thereby the core 4 surrounded by said portion of the armature winding will always be extremely sensitive to changes in its permeability when electrical oscillations are conveyed through the coil surrounding it. When electrical oscillations are conveyed through that portion of the armature winding included between the brushes 12, 12', the resulting variation in permeability of that portion of the core surrounded by the aforesaid portion of said winding produces a corresponding variation in the magnetic flux thereof, thereby producing current variations in the armature winding and in the field magnets of the dynamo. Each of said current variations momentarily increases the strength of the dynamo field and, by the relative motion between the armature winding and the field-producing means of the dynamo, the current variations are greatly amplified, the brushes 10, 10' 11, 11' so connecting or relating the armature winding and coils 9, 9' that the energy of motion of the said armature winding is converted into electrical energy. The greater the speed with which the armature winding travels through the dynamo field, the greater will be the aforesaid amplification of the impulses or variations of current produced in said armature winding when electrical oscillations are conveyed thereto by the brushes 12, 12'.

Any suitable relay or translating device may be included between the points $a$ and $b$ in the external circuit of the dynamo. As shown in Fig. 1, a polarized relay R is connected in said external circuit and the armature 13 thereof may be biased against the contact 13' so that the current of the battery B will normally energize the relay S.

As shown in Fig. 3 a telephone T may be connected between the points $a$, $b$, and the circuit of a relay or sounder R' including the battery B' may be made and broken by the contact 15 on the diaphragm 14 of said telephone and the contact 16 of said circuit.

As shown in Fig. 4 a series of telephonic amplifying devices may be arranged to be operated by the telephone T, and in this case the batteries of the successive circuits may be of progressively increasing strength. In Fig. 4 the energization of the telephone T by the current in the external circuit of the dynamo, varies the current of the battery B' and thereby causes the vibration of the diaphragm 14' of the telephone T'. The vibration of the diaphragm 14', by means of the contacts 15', 16', varies the flow of current from the battery B'' through the telephone T'', and such variation of current causes the vibration of the diaphragm 14''. By the vibration of said diaphragm 14'' very large current variations from the battery B''' may be created in the circuit of the device R' which may be a relay, and said device R' may be so constructed that its armature 17 will remain on its back contact so long as the diaphragm 14'' is vibrating.

While any suitable means may be employed for delivering electrical oscillations to the brushes 12, 12', I prefer as indicated in Fig. 1 to connect said brushes in series with a resonant receiving circuit C M' L, attuned to the frequency of the waves to be received, and between said circuit and the elevated receiving conductor system V E, I may interpose the resonant weeding-out circuit C' M M', in which case the transformers M M' preferably have their windings so spatially related that the natural periods of the resonant receiving circuit and the resonant weeding-out circuit are not appreciably varied by the association of said circuits with each other or with the elevated conductor system.

I do not wish to be limited to the exact apparatus or arrangement of circuits herein disclosed inasmuch as many modifications may be made both in the apparatus and in the circuit arrangements without departing from the spirit of my invention.

I claim,

1. In a detector for electrical oscillations, a closed electrical circuit, means for producing a magnetic field, means for producing relative motion between said field and said circuit, means for varying the magnetic flux threading said circuit by the electrical oscillations to be detected, and means so relating the field-producing means and the closed circuit as to convert the energy of motion of said circuit into electrical energy.

2. In a detector for electrical oscillations, a closed electric circuit, means for producing a magnetic field, means for moving said circuit through said field, means for varying the magnetic flux threading said circuit by the electrical oscillations to be detected whereby current variations are produced in said closed circuit, and means so relating the field-producing means and the closed circuit as to convert the energy of motion of said circuit into electrical energy.

3. In a detector for electrical oscillations, an endless core of magnetic material, a closed electric circuit formed of a conductor spiraled around said core, means for producing a magnetic field threading a portion of said closed electric circuit, means for moving said core and said circuit through said magnetic field, and means for passing the electrical oscillations to be detected through a portion of said closed electric circuit.

4. In a detector for electrical oscillations, an endless core of magnetic material, a closed electric circuit formed of a conductor spiraled around said core, means for producing a magnetic field threading a portion of said closed electric circuit, means for moving said core and circuit through said magnetic field, means for passing the electrical oscillations to be detected through a portion of said closed circuit and means electrically connecting a portion of said closed circuit with the field-producing means.

5. In a detector for electrical oscillations, a solenoid consisting of an endless core of magnetic material and a closed electric circuit formed of insulated wire spiraled around said core and having a portion of its insulation removed throughout its entire extent in a direction substantially at right angles to the pitch of its spirals.

6. A detector for electrical oscillations comprising a dynamo electric machine and a current amplifying device operatively associated therewith, said device comprising a series of telephone receivers one of which is operatively associated with said detector, and the rest of which are adapted to be operated each by the diaphragm of the receiver preceding it, and a source of electromotive force associated with each telephone receiver, said sources being of progressively increasing strength.

7. In a detector for electrical oscillations, a dynamo electric machine comprising field coils and an armature winding, means connecting said armature winding and said field coils in series, a condenser in series with said field coils and armature winding, and means for varying the magnetic flux threading said armature winding by the electrical oscillations to be detected.

In testimony whereof, I have hereunto subscribed my name this 31st day of March 1906.

SEWALL CABOT.

Witnesses:
E. B. TOMLINSON,
GEO. K. WOODWORTH.